United States Patent [19]

Hardy et al.

[11] Patent Number: 5,195,136

[45] Date of Patent: Mar. 16, 1993

[54] METHOD AND APPARATUS FOR DATA ENCRYPTION OR DECRYPTION

[75] Inventors: Douglas A. Hardy, Mesa; Edward C. Meinelt, Gilbert, both of Ariz.

[73] Assignee: Motorola, Inc., Schaumburg, Ill.

[21] Appl. No.: 767,706

[22] Filed: Sep. 30, 1991

[51] Int. Cl.$^5$ ............................................. H04K 1/02
[52] U.S. Cl. ........................................ 380/43; 380/46; 380/50
[58] Field of Search ........................... 380/43, 46, 50; 364/717

[56] References Cited

U.S. PATENT DOCUMENTS

| Re. 33,189 | 3/1990 | Lee et al. | 380/46 |
|---|---|---|---|
| 4,202,051 | 5/1980 | Davida et al. | 364/717 |
| 4,608,455 | 8/1986 | McNair | 380/43 |
| 4,663,500 | 5/1987 | Okamoto et al. | 380/50 |
| 4,685,132 | 8/1987 | Bishop et al. | 380/46 |
| 4,802,217 | 1/1989 | Michener | 380/46 |
| 4,815,130 | 3/1989 | Lee et al. | 380/50 |
| 4,890,324 | 12/1989 | Jansen | 380/46 |
| 4,897,876 | 1/1990 | Davies | 380/43 |
| 4,984,247 | 1/1991 | Kaufmann et al. | 375/1 |
| 5,060,265 | 10/1991 | Finkelstein | 380/46 |
| 5,086,467 | 2/1992 | Malek | 380/9 |
| 5,105,376 | 4/1992 | Pedron | 364/717 |

Primary Examiner—Salvatore Cangialosi
Attorney, Agent, or Firm—Frederick M. Fliegel

[57] ABSTRACT

A cryptographic apparatus comprises a linear feedback shift register for providing a pseudo-random code, coupled to a ciphering device, which is in turn coupled to an adder. The ciphering device encrypts the pseudo-random code. One adder circuit input is coupled to a ciphering device, and the other adder circuit input is coupled to the data input. The adder circuit adds data input signals to ciphering device signals to provide output signals. A method for operation of a ciphering engine is described comprising the steps of providing a random number and setting tap weights for a linear feedback shift register, obtaining a pseudo-random bit stream therefrom, and then encrypting the pseudo-random bit stream to generating a traffic key stream. The traffic key stream is added to a data stream to produce encrypted data from plain-text data or, alternatively, the traffic key stream is added to an encrypted data stream to produce plain-text data.

19 Claims, 3 Drawing Sheets

METHOD AND APPARATUS FOR DATA ENCRYPTION OR DECRYPTION

FIELD OF THE INVENTION

The present invention concerns an improved method and apparatus for secure communication and, more particularly, for error reduction in cipher systems employing the Federal Information Processing Standards Data Encryption Standard and similar ciphering techniques.

BACKGROUND OF THE INVENTION

The present invention pertains to data encryption algorithms, as for example, the Data Encryption Standard (DES), as described in Federal Information Processing Standards Publications FIPS 46-1, "Data Encryption Standard", and FIPS 81, "DES Modes of Operation", both published by the United States Department of Commerce. The latter describes four different techniques approved for employing the Data Encryption Standard; each of these techniques operates in both an Encrypt and a Decrypt mode for performing the desired encryption and corresponding decryption functions. These techniques are the electronic code book mode, the cipher block chaining mode, and the cipher and output feedback modes. These ciphering methods operate in either a block mode or a stream mode. A brief summary of these techniques follows.

The electronic code book mode is one in which 64 bit blocks of input data are successively and independently processed, such that an error in one bit of a given block of encrypted data, due, for example, to corruption in data transmission and reception, results in error rates approximating fifty percent in decrypting the particular data block affected by the error and does not affect the error rate in decrypting other encrypted data blocks.

The cipher block chaining mode is one in which the first input data block is exclusive-ORed with an initialization vector, also known as a traffic key or as a traffic variable, and the resultant data block is input to a DES-compliant ciphering device. The output data are transmitted as the first block of cipher-text and are also exclusive-ORed with the second input data block. The result of the exclusive-OR operation is input to a DES-compliant ciphering device. The encrypted output data are then transmitted as the second output data block and additionally are exclusive-ORed with the third input data block. This chaining procedure continues throughout the enciphering process and a similar procedure applies for deciphering the resultant cipher-text. A single error in one bit of a given block of encrypted data in the cipher block chaining mode results in corruption of the data block containing the single bit error and succeeding blocks as well. Another disadvantage to this method is that blocks containing less than 64 bits require special handling.

In the cipher feedback mode, an integral number K of cipher-text output bits are placed to one side of the DES-compliant ciphering device input data buffer. K bits of input data are exclusive-ORed with the DES-compliant ciphering device output data block to produce cipher-text. An inverse arrangement at the receiver decrypts the cipher-text blocks to recover a decrypted plain-text message. Both the encryption and decryption operations utilize the data encryption algorithm in the encrypt mode, however, the decrypt mode can be employed as an alternative. In the cipher feedback mode of operation, a single bit error in the cipher-text results in corruption of that data block in exactly the same place where the error occurred and the succeeding data block will have a fifty percent probability of error for any given bit.

Block data ciphering techniques have inherent advantages over stream modes in that the block boundaries permit re-synchronization in the event that a bit is added to or subtracted from the data during transmission and reception. This re-synchronization property is known as "self-synchronization". Ciphering techniques which rely on stream encryption/decryption modes cannot self-synchronize and so require re-initialization communication when synchronization is lost. This causes block data ciphering techniques to be greatly preferred for practical system applications, in spite of substantially greater data corruption occurring for each bit which is in error than is the case for some stream ciphering techniques.

A limitation of weakness of the above described prior art arrangement is that single bit errors in transmission or reception of the encrypted data stream cause multiple bit errors in the decrypted data stream. This property of error extension makes it very difficult to use systems such as DES which exhibit error extension in noisy environments.

What is needed is a block mode method for data encryption, transmission, reception and decryption which includes the integrity of the Federal Data Encryption Standard, and yet which provides minimal errors in the decrypted text for each error occurring in transmission and/or reception of the encrypted data stream, i.e., little or no error extension.

SUMMARY OF THE INVENTION

A cryptographic apparatus comprises a linear feedback shift register for providing a pseudo-random code coupled to a ciphering device and a bit stream combiner. The ciphering device encrypts the pseudo-random code from the linear feedback shift register. A data input for accepting an input digital message and a data output for providing an output digital message are coupled to the bit stream combiner, as for example, an adder circuit. One input of the adder circuit is coupled to the Data Encryption Standard ciphering device, and the other input of the adder circuit is coupled to the data input, with the output of the adder circuit coupled to the data output. The adder circuit adds signals from the data input to signals from the ciphering device to provide output signals to the data output.

It is desirable but not essential that the circuit for adding signals from the data input to signals from the ciphering device comprise an exclusive-OR gate.

A method for operation of a ciphering engine is described which comprises the steps of providing a random number and setting tap weights for a linear feedback shift register, using the linear feedback shift register to obtain a pseudo-random bit stream and then generating a traffic key stream from the pseudo-random bit stream by encrypting the pseudo-random bit stream. The traffic key stream is added to a data stream to produce encrypted data from plain-text data or, alternatively, the traffic key stream is added an encrypted data stream to produce plain-text data.

The above and other features and advantages of the present invention will be better understood from the following detailed description taken in conjunction with the accompanying drawings.

DESCRIPTION OF THE PREFERRED EMBODIMENT

As used herein the words "encryption", "enciphering" and "encoding" mean conversion of a plain-text message to a secure or cipher-text message, while "decryption", "deciphering" and "decoding" refer to the inverse of this process. As used herein the words "voice", "data", "input data", "output data", and "signal" are intended to include any type of transmitted or received information, including but not limited to audio information, facsimile, video, computer data, graphical data, or combinations thereof.

Figure 1:
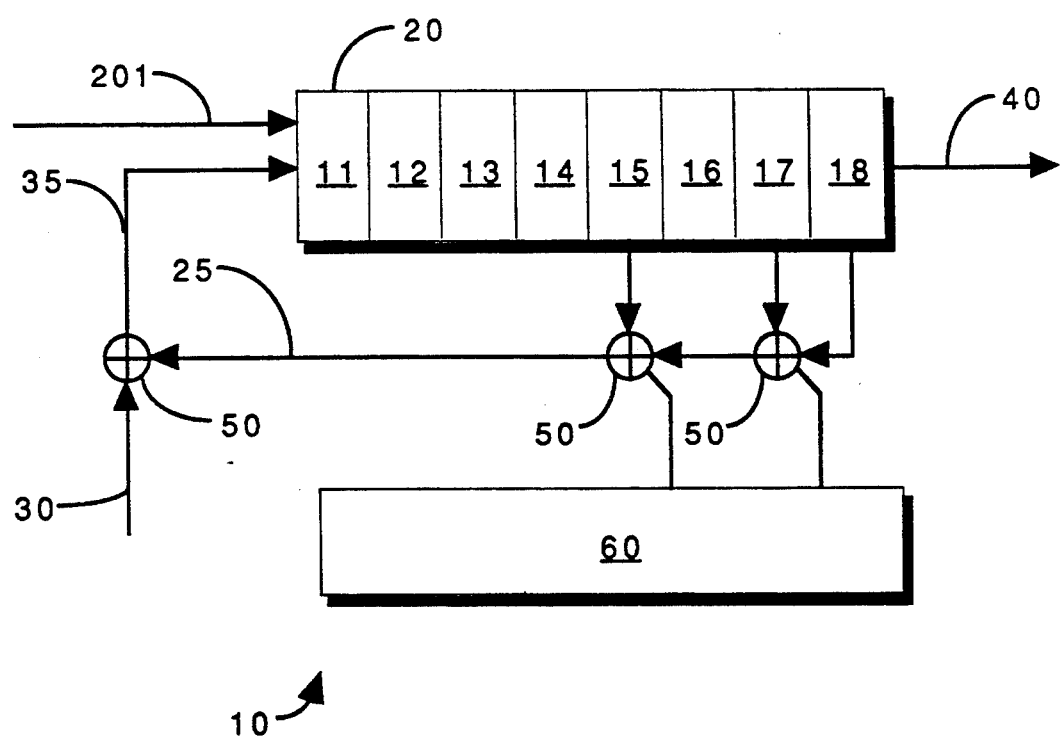
FIG. 1 (prior art) is a block diagram of a linear feedback shift register.

By way of example and not intended to be limiting, FIG. 1 illustrates a block diagram of a prior art linear feedback shift register 10 comprising shift register 20 having cells 11–18, feedback path 25, output 40, clocking line 201, and adder circuits 50. Linear feedback shift register 10 has input 30 while shift register 20 has input 35.

Also shown in FIG. 1 is control means 60. Input 35 contains signals formed from the sum of the input signal present on input 30 and those from feedback path 25. The signals on feedback path 25 are formed from sums of signals on feedback path 25 and those emergent from designated cells, e.g., cells 15, 17, 18 of shift register 20. Any subset of cells 11–18 comprising shift register 20 may be chosen as designated cells, and shift register 20 may comprise an arbitrary number of cells, with the number and relative positions of designated cells being chosen to suit a particular application.

In operation, input of a logical "one" to input 30 will result in a pseudo-random signal at output 40, according to which cells of linear feedback shift register 10 are chosen as designated cells. To start operation, linear feedback shift register 10 is loaded with a predetermined pattern of "ones" and "zeroes", referred to as a "seed", and a clocking signal is supplied via line 201. Particular choices of selected seeds, together with suitably chosen tap weights yield maximal length pseudo-random codes appearing at output 40 having lengths of $2^M - 1$ bits where M represents the number of stages in the shift register. Linear feedback shift registers are well known in the art and are discussed, for example, in U.S. Pat. No. 4,974,184, entitled "Maximum length pseudo-random test pattern generator via feedback network modification", to Lanse Avra, which is incorporated herein by reference.

Linear feedback shift registers such as 10 thus provide a way to generate pseudo-random pulse sequences having greater length than the data, or seed, initially inserted into linear feedback shift register 10 via, for example, input 30. Linear feedback shift registers such as 10 and uses thereof are well known in the art. Control means 60 allows the particular pseudo-random code generated by linear feedback shift register 10 to be externally programmed and to be changed at arbitrary intervals as need arises.

By way of example and not intended to be limiting, linear feedback shift register 10 can be chosen to be a ninety-three stage shift register configured to provide a maximal length sequence. For these parameters, the period of the output pseudo-random bit stream derived from linear feedback shift register 10 at a data rate corresponding to 9600 baud, or 9600 bits per second, is about $3 \times 10^{16}$ years. This provides a good approximation to a random, non-repeating data stream for practical communications systems.

The function provided by linear feedback shift register 10 can also be implemented by means of software, e.g., a computer program which causes a general purpose computer or digital signal processor to emulate the function of linear feedback shift register 10 without necessarily closely resembling a conventional hardware implementation thereof, and without compromising the qualities of the resultant pseudo-random bit stream.

Figure 2:
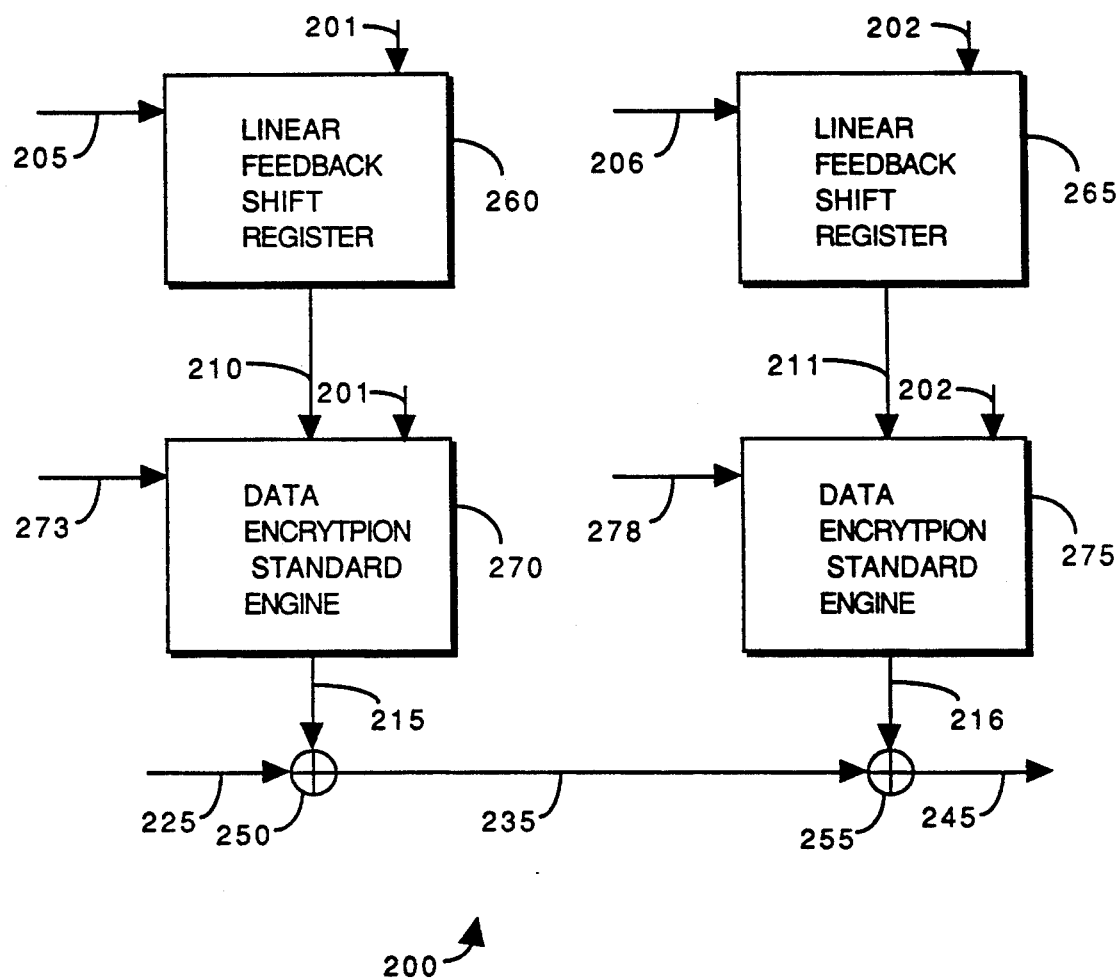
FIG. 2 is a schematic diagram of a secure communications link.

FIG. 2 illustrates a secure communications channel 200, according to the present invention, comprising data input 225, encrypted communications link 235, and data output 245, together with seed inputs 205, 206, linear feedback shift registers 260, 265, pseudo-random sequence outputs 210, 211 data encryption standard devices 270, 275, clocking line 201, 202 and adder circuits 250, 255. Data encryption standard devices 270, 275 inluding initialization vector input 273, 278 may implement a standardized block cipher algorithm in the Decrypt mode in accordance with United States Government regulations as described in detail in FIPS 81.

In operation, identical random numbers or seeds are provided at inputs 205, 206 to linear feedback shift registers 260, 265 having identically chosen tap weights and sequences resulting in identical but synchronized pseudo-random sequences at outputs 210, 211.

Initialization vectors specifying the internal settings of data encryption standard devices 270, 275 are supplied via input 273, 278 prior to the onset of encryption/decryption.

Outputs 210, 211 provide these identical pseudo-random sequences to data encryption standard devices 270, 275 to produce identical synchronized traffic key streams at outputs 215, 216.

The plain-text input to adder 250 via input 225 is combined with the traffic key stream from output 215 to produce cipher-text on secure communications link 235.

The cipher-text on secure communications link 235 is input to adder 255 and combined with the traffic key stream from output 216, which is synchronized with the cipher-text on communications link 235, to reproduce plain-text at output 245. Adders 250, 255 may comprise, for example, XOR gates.

A particular feature of the invented arrangement is that a single bit error occurring in the encrypted data on communications link 235, e.g., due to noise in the transmission path, results in only a single bit error in the plain-text data from output 245. The error extension effect encountered with prior art arrangements, especially those using DES, is avoided. This significantly improves the robustness of secure communications systems.

Figure 3:
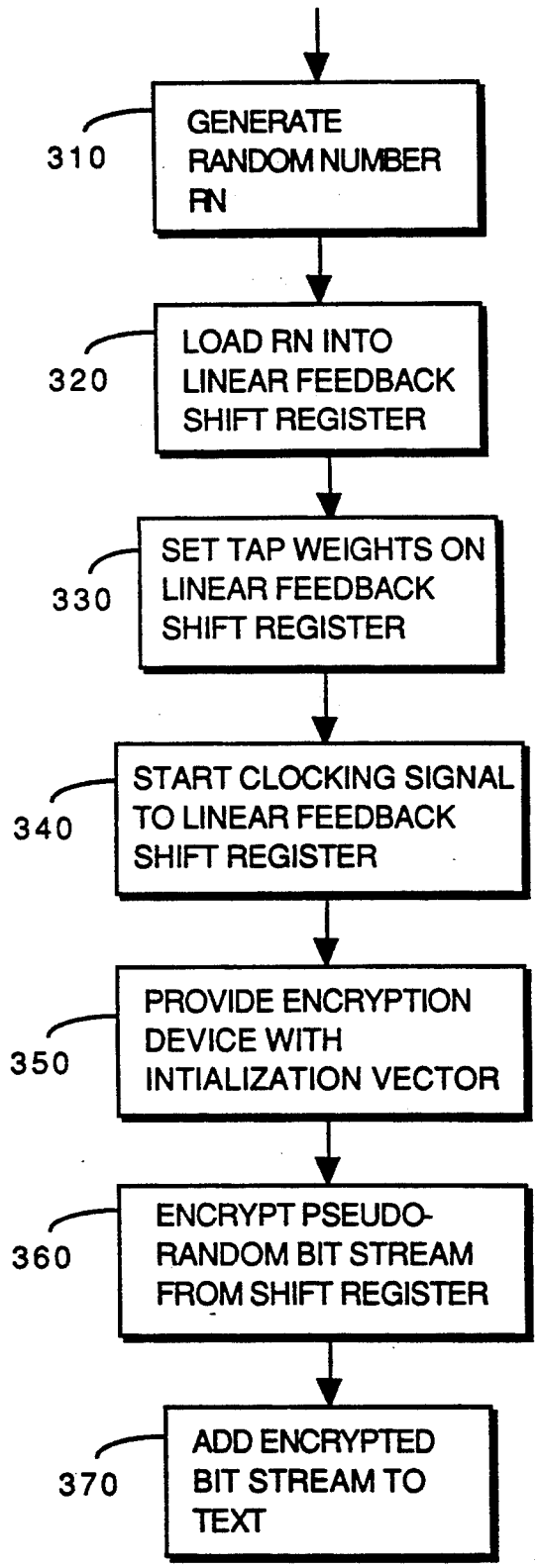
FIG. 3 is a flow diagram describing the method for encryption and decryption in accordance with the present invention.

FIG. 3 is a flow diagram describing process 300 for encryption and decryption in accordance with the present invention.

Referring now to FIGS. 2 and 3, a random number RN is generated in block 310 and in block 320 is loaded into linear feedback shift registers 260, 265 as a seed. Tap weights are set in block 330 on linear feedback shift registers 260, 265 and a clocking signal is applied thereto in block 340 to start generation of pseudo-random codes at outputs 210, 211. Alternatively, the tap weights may be built-in by suitable hardware connections, such as, for example, by predetermined interconnections on an integrated circuit containing the shift register.

The pseudo-random bit stream from linear feedback shift registers 260, 265 is encrypted in block 360 by, for example, DES-compliant ciphering engines 270, 275 which has been initialized in block 350 with an appropriate initialization vector at inputs 273, 278. The resultant traffic key stream 215, 216 is added in block 370 to a text bit stream 225, 235, for example in adders 250. Due to the symmetry of the addition, process 300 converts plain-text input data to cipher-text output data or cipher-text input data to plain-text output data, when appropriate random number, tap weight, and initialization vector data have been supplied.

This method allows encryption and decryption of digitized voice, modem, facsimile or video data to be accompanied by the integrity associated with the Federal Data Encryption Standard without suffering the error extension properties incurred in prior art implementations thereof. Thus, equipment incorporating this invention can function in contexts where high probabilities of single-bit errors would otherwise strongly discourage use of the Data Encryption Standard.

Based on the foregoing description, it will be apparent to those of skill in the art that the present invention solves the problems and achieves the goals set forth earlier, and has substantial advantages as pointed out herein. Further the present invention provides a method and apparatus having the integrity of security afforded by the Federal Data Encryption Standard together with the advantages of a low error rate and the self-synchronizing features of block mode data encryption, transmission, reception, and decryption, and without error extension.

While the present invention has been described in terms of particular elements, structures and steps, these choices are for convenience of explanation and not intended to be limiting and, as those of skill in the art will understand based on the description herein, the present invention applies to other choices of elements, arrangements and process steps, and it is intended to include in the claims that follow, these and other variations as will occur to those of skill in the art based on the present disclosure.

What is claimed is:

1. A cryptographic apparatus comprising:
linear feedback shift register means having a seed input for accepting a random number and having a weighting input for accepting tap weights;
adder means coupled to said linear feedback shift register means, said adder means for combining output from designated cells of said linear feedback shift register means to form an output signal from said linear feedback shift register means comprising a psuedo-random code;
control means coupled to said adder means, said control means for selecting said designated cells of said linear feedback shift register means;
ciphering device means including a Data Encryption Standard ciphering device operating in Cipher Feedback Mode, said ciphering device means coupled to said linear feedback shift register means, said ciphering device means for encrypting the pseudo-random code;
data input means, said data input means for accepting an input digital message; and
data output means, said data output means for providing an output digital message; and
combiner means, one input of said combiner means coupled to said ciphering device means, another input of said combiner means coupled to said data input means, and an output of said combiner means coupled to said data output means, said combiner means for combining signals from said data input means to signals from said ciphering device means to provide output signals to said data output means.

2. The cryptographic apparatus claimed in claim 1, wherein said combiner means comprises an adder circuit.

3. The cryptographic apparatus claimed in claim 1, wherein said Data Encryption Standard ciphering device operates in accordance with Decrypt Mode.

4. The cryptographic apparatus claimed in claim 1, wherein said Data Encryption Standard ciphering device operates in accordance with Encrypt Mode.

5. The cryptographic apparatus claimed in claim 1, wherein said linear feedback shift register means comprises an N-stage linear feedback shift register, wherein N represents a number of stages comprising said N-stage linear feedback shift register and $N>25$.

6. A cryptographic communications system comprising one or more combinations of:
at least a first cryptographic communications terminal, comprising:
a first linear feedback shift register which is externally programmable at arbitrary intervals to change a particular pseudo-random code generated thereby and having a seed input for accepting a random number and a weighting input for accepting tap weights;
a first ciphering device, said first ciphering device coupled to said linear feedback shift register, said first ciphering device comprising a first Data Encryption Standard ciphering device operating in Cipher Feedback Mode;
a data input;
a first data output; and
a first adder circuit, one input of said first adder circuit coupled to said first ciphering device, another input of said first adder circuit coupled to said data input, and an output of said first adder circuit coupled to said first data output; and
at least a second cryptographic communications terminal comprising:
a second linear feedback shift register which is externally programmable at arbitrary intervals coinciding with said arbitrary intervals at which said first linear feedback shift register is externally programmed to change a particular pseudo-random code generated thereby and having a seed input for accepting a random number and a weighting input for accepting tap weights, said first and second linear feedback shift registers operating to generate the same pseudo-random code;
a second ciphering device, said second ciphering device coupled to said second linear feedback shift register, said second ciphering device comprising a second Data Encryption Standard ciphering device operating in Cipher Feedback Mode;

a second data output; and a second adder circuit, one input of said second adder circuit coupled to said second ciphering device, another input of said second adder circuit coupled to said first data output, and an output of said second adder circuit coupled to said second data output.

7. The cryptographic communications system claimed in claim 6, wherein one of said first or second cryptographic communications terminals operates to produce an encrypted message from a plain-text message and another of said first or second cryptographic communications terminals operates to produce a plain-text message from said encrypted message.

8. The cryptographic communications system claimed in claim 6, wherein said first and second adder circuits each comprise exclusive-OR means.

9. The cryptographic apparatus claimed in claim 6, wherein said first and second Data Encryption Standard ciphering devices operate in accordance with Encrypt Mode.

10. The cryptographic apparatus claimed in claim 6, wherein said first and second Data Encryption Standard ciphering devices operate in accordance with Decrypt Mode.

11. The cryptographic communications system claimed in claim 6, wherein said data input is a video data input, and said first and second data outputs are video data outputs.

12. The cryptographic communications system claimed in claim 6, wherein said data input is a facsimile signal input, and said first and second data outputs are facsimile signal outputs.

13. The cryptographic communications system claimed in claim 6, wherein said data input is a digitally encoded voice signal input, and said first and second data outputs are digitally encoded voice signal outputs.

14. A method for operation of a ciphering engine comprising the steps of:

providing a random number to a programmable linear feedback shift register;

providing tap weights to the programmable linear feedback shift register;

using the programmable linear feedback shift register to obtain a psuedo-random bit stream;

generating a traffic key stream from the psuedo-random bit stream using a Data Encryption Standard device in Cipher Feedback Mode; and combining the traffic key stream with an input data stream to produce an output data stream modified by the traffic key stream.

15. The method for operation of a ciphering engine as claimed in claim 14, wherein said generating step further includes the step of using a Data Encryption Standard device in Decrypt Cipher Feedback Mode and operating on the pseudo-random bit stream from the programmable linear feedback shift register to generate a traffic key stream.

16. The method for operation of a ciphering engine claimed in claim 14, wherein said combining step further includes the step of performing a logical exclusive-OR operation to add the input data stream to the traffic key stream.

17. The method for operation of a ciphering engine claimed in claim 14, wherein the input data stream comprises a cipher-text data stream and wherein said combining step comprises the step of decrypting the cipher-text data stream to produce a plain-text output data stream.

18. The method for operation of a ciphering engine claimed in claim 14, wherein the input data stream comprises a plain-text stream and wherein said combining step comprises the step of encrypting the plain-text data stream to produce a cipher-text output data stream.

19. The method for operation of a ciphering engine claimed in claim 14, wherein said using step includes the step of using a programmable linear feedback shift register having N stages, where N is greater than twenty-five, to obtain a pseudo-random bit stream.

* * * * *